United States Patent [19]

Wrasidlo et al.

[11] 4,159,251

[45] Jun. 26, 1979

[54] ULTRAFILTRATION MEMBRANES BASED ON HETEROAROMATIC POLYMERS

[75] Inventors: Wolfgang J. Wrasidlo, La Jolla, Calif.; Soloman Spiegelman, New York, N.Y.

[73] Assignee: Pharmaco, Inc., Champaign, Ill.

[21] Appl. No.: 728,453

[22] Filed: Sep. 29, 1976

[51] Int. Cl.$^2$ .................. B01D 13/04; B01D 31/00
[52] U.S. Cl. .................. 210/321 R; 210/500 M; 264/41; 521/63
[58] Field of Search .................. 210/500 M, 433 M; 264/41; 210/23 F, 490, 505, 506, DIG. 23, 55, 446; 260/248 R; 55/158; 521/63; 528/424

[56] References Cited

U.S. PATENT DOCUMENTS

| | | | |
|---|---|---|---|
| 3,228,876 | 1/1966 | Mahon | 210/DIG. 23 |
| 3,509,108 | 4/1970 | Prince | 260/603 C |
| 3,615,024 | 10/1971 | Michaels | 210/490 |
| 3,723,306 | 3/1973 | Bridgeford | 210/22 |
| 3,926,798 | 12/1975 | Cadotte | 210/500 M |
| 3,945,926 | 3/1976 | Kesting | 210/500 M |
| 4,020,142 | 4/1977 | Davis et al. | 210/500 M |

OTHER PUBLICATIONS

Chemical Abstracts: 1974: 100063t, vol. 80, p. 271.
Scala et al., "Exploratory Research on Heteroaromatic Polymer Reverse Osmosis Membranes", U.S. Dept. of Interior, 10/7/72.
Millipore Catalog MF-67, Copyright 1966 by Millipore Corp., Bedford, Mass., pp. 2, 3, 8, 9, 10, 11 and 12.
Polymer Handbook, J. Brandrup et al., Publ. by John Wiley and Sons, New York, 1975, pp. 4-258.

*Primary Examiner*—Charles N. Hart
*Assistant Examiner*—David R. Sadowski
*Attorney, Agent, or Firm*—Clarence A. O'Brien; Harvey B. Jacobson

[57] ABSTRACT

Membranes which are useful in ultrafiltration processes are prepared by casting films from solutions of heteroaromatic polymers and subsequently quenching these films into solvents which cause gelation of the polymers. Examples of polymers employed in the preparation of microporous membranes are: poly-as-triazines, polyquinoxalines, poly (pyrazinoquinoxalines), polyquinolines and poly (anthrazolines). Membrane properties such as solvent flux, specific water content and pore size are readily controlled by proper choice of polymer concentration, solvents, and the addition of nonsolvents, salts and/or surfactants to the casting solutions.

38 Claims, No Drawings

ULTRAFILTRATION MEMBRANES BASED ON HETEROAROMATIC POLYMERS

BACKGROUND OF THE INVENTION

Ultrafiltration of solutions through microporous membrane filters is an old and well established method. Numerous types of materials ranging from animal membranes to synthetic organic polymers and many different processes of forming these microporous membranes have been described in the literature. Several reviews on ultrafiltration have been published (J. D. Ferry, Chemical Reviews, Vol. 18, (3), pp. 373–455 (1936); A. S. Michaels, Progress in Separation and Purification, Vol. 1, 297 (1968); C. J. Van Oss, Purification and Separation, Vol. 3, 97 (1972)).

Various types of ultrafilters are being used in commercial processes for performing separations and concentrations of various solutes from their respective solutions. Loeb type membranes made of cellulose diacetate are described in U.S. Pat. Nos. 3,133,132 and 3,133,137. Microporous membranes based on other types of polymeric materials including the utilization of polysulfone, cellulose butyrate, cellulose nitrate, polystyrene and other polymers are disclosed in U.S. Pat. No. 3,676,203. Other related patents cited for reference are U.S. Pat. Nos. 3,556,992, 3,579,412, 3,228,876, 3,364,288, Dutch Pat. No. 74,531 and French Pat. Nos. 555,471 and 1,075,417. Various ultrafiltration membranes used in commercial processes are marketed under the trade names of "Millipore" by Millipore Corporation, "Unipore" by Bio Rad Laboratories, "Diaflo" by Amicon Company and "Nucleopore" by Nucleopore Corporation.

When utilizing ultrafiltration membranes in such applications as the treatment of waste effluents, the separation and purification of biological fluids, the clarification of colloidal solutions and the sizing of molecules, it is desirable that the ultrafilter be resistant to compaction under pressure, insensitive to pH of the feed solution, unaffected by the solvent used and be stable at elevated temperatures. It is also advantageous that the membrane filter not be affected by repeated drying and rewetting (i.e. stable to wet-dry cycling) with the feed solution. In the quantitative separation and sizing of solute molecules of widely different molecular weights it is of utmost importance that the surface pores are of nearly the same size (i.e., isoporous) and that the size of surface pores can be varied over a wide range from a few angstroms to several thousands of angstroms. None of the membranes cited in the previous art fulfill all these requirements.

As will be hereinafter set forth in greater detail, ultrafiltration membranes prepared according to the process of this invention possess these desirable characteristics.

SUMMARY OF THE INVENTION

This invention relates to isoporous, hydrophobic membranes and to methods for the preparation thereof. More specifically the invention is concerned with ultrafiltration membranes which are:

1. resistant to compaction at applied pressures up to 1000 psi;
2. unaffected by exposure to solutions over the entire pH range from 1 to 14;
3. useful in operation at temperatures in excess of 250° C.;
4. resistant to attack by most common organic solvents; and
5. useful with respect to high filtration rates after several wet-dry cycles.

Another object of this invention is to provide a method for the preparation of ultrafiltration membranes which are substantially isoporous by making use of nonsolvent quenching techniques and whose pore size can be varied in a controlled manner from a few angstroms to several thousand angstroms.

DESCRIPTION OF THE PREFERRED EMBODIMENTS

The heteroaromatic polymers which may be used in accordance with this invention to form microporous membranes include poly-as-triazines which are characterized by the recurring structural formula:

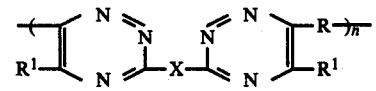

and/or isomers

Example

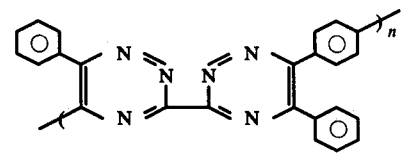

(Structure I)

wherein X is a carbon-to-carbon bond, oxygen, sulfur, sulfone, methylene, isopropylene, carbonyl or a pyridylidene group, R' is a hydrogen atom, an aliphatic group such as an alkyl radical having 1 to 12 carbon atoms or an aromatic group such as a phenyl or toluyl radical, R is a divalent radical consisting of groups such as phenylene, diphenylene, diphenyl ether, diphenylsulfide, diphenyl sulfone, diphenylmethane, naphthyl, pyridylidene or alkylene having 1 to 6 carbon atoms, and n is 10 to 10,000. Preferably, the poly-as-triazines as well as the other heteroaromatic polymers used in accordance with this invention have a molecular weight greater than 20,000.

Other heteroaromatic polymers useful in forming microporous membranes in accordance with this invention are polyquinoxalines having the following repeating units:

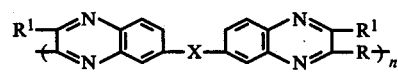

and/or isomers

Example

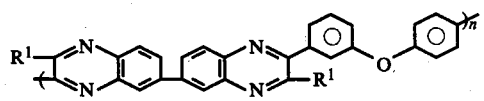

R' = Hydrogen  Structure II
R' = C6H5  Structure III and poly (pyrazinoquinoxalines) having the recurring structural formula:

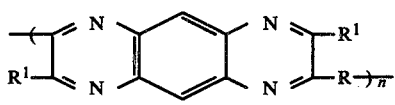

wherein X, R, R' and n are the same as defined with respect to the poly-as-triazines.

Yet other heteroaromatic polymers useful in forming microporous membranes in accordance with this invention are polyquinolines having the following repeating units:

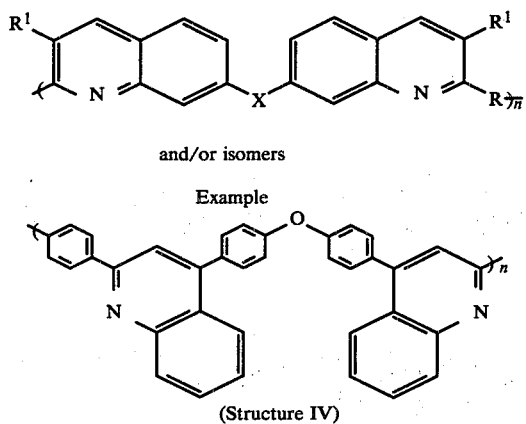

and/or isomers

Example (Structure IV)

and poly (anthrazolines) having the recurring structural formulas:

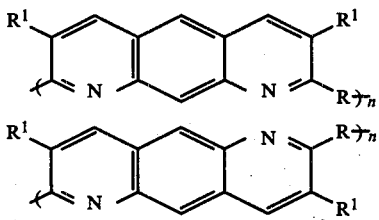

wherein X, R, R' and n are the same as defined with respect to the poly-as-triazines.

The invention also contemplates incorporating covalently bonded groups into the heteroaromatic polymers discussed above by treating the polymers either before or after quenching with appropriate reactants. The covalently bonded groups include sulfonic acids such as derived from chlorosulfonic acids, hydroxy groups, carboxylic acids, mercaptans and amines. Preferably, the heteroaromatic polymers will have at least one of the covalently bonded groups for every chain length interval of six heteroaromatic radicals. Additionally, the invention contemplates employing heteroaromatic copolymers formed by copolymerizing the heteroaromatic polymers discussed above or their monomers.

This invention also comprises a method of preparing an ultrafiltration membrane by forming a polymer solution of the above heteroaromatic polymers in which the concentration of polymer is preferably at least 2 weight percent and not in excess of 30 weight percent. The polymer solution is then cast to a finite thickness and the wet film is caused to gel by quenching into an appropriate nonsolvent in which the polymer shows a tendency to swell, coagulate or precipitate. The solution casting operation may be carried out on either nonporous substrates such as glass plates or stainless steel belts or on porous substrates such as paper, fabric, etc. In the case of nonporous substrates the membrane separates from the film supporting substrate, while in the case of porous substrates the substrate becomes an integral part of the ultrafilter.

The solvents which may be used to form the polymer solutions of the heteroaromatic polymers include aromatic solvents such as cresols, preferably meta-cresol, aliphatic hydrocarbons and particularly halogenated aliphatic hydrocarbons such as chloroform, methyl chloroform, tetrachloroethane and methylene chloride, aliphatic amides such as dimethylacetamide and inorganic acidic solvents such as sulfuric acid and methanesulfonic acid. The non-solvents which may be used in the quenching bath include aliphatic alcohols and particularly lower alkanols such as methanol, ethyl alcohol, isopropyl alcohol and amyl alcohol, aliphatic hydrocarbons, aromatic hydrocarbons such as toluene, aliphatic ketones, aliphatic aldehydes, aliphatic nitriles, and aqueous baths including aqueous solutions of organic bases and acids.

A particular feature of the invention and one that emphasizes its simplicity is that the gelation process requires no particular control of the environment in which the membrane is formed. Generally, ambient conditions without any particular atmosphere control suffice to make membranes of uniform porosity and pore size. Other simplifying features of the membrane formation process described in this invention is that reproducible and uniform membranes are obtained without any particular control of process variables such as casting speed, quench angle, quench bath temperature, etc. It is believed that the insensitivity of membrane formation towards environmental and process conditions lies in (1) the thixotropic-like nature of the polymer solutions wherein the heteroaromatic polymers act as weak bases to the acidic solvents employed such as meta-cresol, and wherein the viscosity of these strongly interacting solute-solvent systems does not significantly change within the ordinarily encountered temperature fluctuations of a room; (2) the low affinity of these heteroaromatic polymers and solvents such as cresols and chlorinated hydrocarbons toward moisture in the air; and (3) the extreme rapidity with which the heteroaromatic polymers precipitate when solutions of these polymers come in contact with the proper nonsolvents in the quench bath.

These fast gelation rates are believed to be due to the extreme insolubility of the heteroaromatic polymers used in this invention towards the liquids or vapors of these liquids used for quenching such as alcohols, hydrocarbons, ketones and also due to the relatively low interfacial tension between the solvents and nonsolvents used in this invention. In this respect it is the extreme insolubility of these polymers toward liquids such as alcohols, ketones, hydrocarbons, aldehydes, nitriles and aqueous solutions of organic bases and acids that renders membranes made from these polymers insensitive towards these liquids and makes it possible to utilize such solvents for ultrafiltration.

Other remarkable features of the heteroaromatic polymers used in this invention are their exceptional thermal and mechanical stabilities. For example, the polymers used in this invention all exhibit heat distortion temperatures above 250° C. and some polymers such as the polyphenylquinoxalines show heat distortion temperatures in excess of 350° C. These temperatures lie 100°–200° C. above those of polymers used for the formation of ultrafiltration membranes in accordance with the prior art. Therefore membranes made from these heteroaromatic polymers are capable of operation at elevated temperatures where previous membranes are subject to thermal distortion and collapse of pores.

Yet another important feature of the present invention is the ease with which the pore size of the membrane can be varied over a wide range from a few angstroms to hundreds of angstroms by varying simple casting parameters such as the nature of the solvent, the type of nonsolvent or the concentration of the polymer in the casting solution. Also, membrane properties can be readily controlled by the addition of salts such as alkali metal salts, for example, lithium chloride and sodium chloride and Group IIB metal salts, for example, zinc chloride and by the addition of surfactants. Typical surfactants are sodium dodecyl sulfate and alkylaryl polyether alcohols such as sold under the trademarks "NP-40" (Shell Chemical Co.) and "Triton X-100" (Rohm & Haas Co.). "NP-40" is an octaphenyl ethoxylate containing approximately 9 moles of ethylene oxide in the polymer chain and "Triton X-100" is similarly a condensation product of octaphenol and ethylene oxide.

This invention also comprises generating a highly asymmetric structure which consists of a ultrathin barrier film of the desired pore size which is supported by a highly porous substructure. This membrane structure provides for maximum flow of solvent with a minimum amount of plugging by the material being filtered. This is due to the absence of long and/or tortuous channels found in all other ultrafiltration membranes. This microporous structure is formed by employing a combination of solvents such as chloroform and meta-cresol, tetrachloroethane and meta-cresol, methyl chloroform and meta-cresol, methylene chloride and meta-cresol, tetrachloroethane and phenol, methyl chloroform and phenol and methylene chloride and phenol which, due to the evaporation of the low boiling component, causes a rapid interfacial skin formation. The polymer is then quenched into nonsolvents wherein the bulk of the membrane is allowed to gel. For example, by using this technique asymmetry factors are easily obtained in which the ratio of bulk pore size to surface pore sizes is 6000:1.

The ultrafiltration membranes of this invention may be used for in-line filtration of intravenous infusions without requiring pressure devices. More particularly, the ultrafilters of this invention have such extremely small surface pore size and still have such acceptable solution flow rates that the filters not only remove inanimate particulate contaminants but also bacteria and viruses. Other examples of uses are: (1) concentration of filtration of dilute protein solutions by using simple hand operated syringes; (2) concentration or filtration of industrial protein preparations; (3) filtration of bulk fluids for intravenous solutions (large volume parenterals) on the industrial scale; (4) filtration and/or clarification of beverages (wine, beer, etc.), syrups, etc.; (5) filtration of drug solutions prior to packaging; and (6) preparation of sterile, particle free water and aqueous chemical solutions.

The following examples are given to illustrate the various types of ultrafiltration membranes and the process of the present invention, but, however, are not intended to limit the scope of the invention as defined in the appended claims.

EXAMPLE 1

A solution containing 8.5 weight percent of polyphenyl-as-triazine (Structure I) in meta-cresol is spread onto a glass plate by means of a solution casting knife of 0.02 inch knife gap. The wet film is allowed to remain on the glass plate for a period of 10 minutes. Then the glass plate is immersed into a quenching bath containing a mixture of 50 volume percent ethyl alcohol and 50 volume percent of toluene. After a period of 20 seconds the film becomes opaque and is allowed to remain in the bath for an additional period of 30 minutes. The resulting ultrafiltration membrane is then stored in a mixture of 20 vol. percent ethyl alcohol and 80 vol. percent distilled water. This membrane has a water flux of $1.896 \times 10^{-8}$ cc/dyne-sec, a specific water content of 0.578 g/cm$^3$, an average pore size of 20 to 30 Å and a membrane thickness of 0.05 cm.

When used as an ultrafilter, the membrane described above passes salts such as sodium chloride, sodium phosphate, calcium sulfate, and low molecular weight compounds such as phenol red, fluorescein, p-aminobenzoic acid hydrochloride, acriflavin hydrochloride, and ribonuclease without loss or change in concentration. However, higher molecular weight compounds such as double stranded DNA with molecular weights of about 10,000 and higher, Dextran 200 and Dextran 2000 (blue), and proteins such as bovine serum albumin and hemoglobin are retained by the filter.

A summary of ultrafiltration data obtained for this membrane is shown in the Table.

TABLE

Ultrafiltration of various solutions through polyphenyl-as-triazine membranes with a pore size of about 30 A

| Solute | Molecular Weight | Feed Concentration (%) | Solvent | Additive To Solvent | % Solute In Ultrafiltrate |
|---|---|---|---|---|---|
| Phenol Red | | .001 | water | none | 100 |
| Fluorescein | | $10^{-4}$ | water | none | 100 |
| Fluorescein | | $10^{-8}$ | water | none | 0 |
| Fluorescein | | $10^{-8}$ | water | SDS | 100 |
| Fluorescein | | $10^{-8}$ | water | TCA | 100 |
| Dextran | 10,000 | .1 | water | none | 88 |
| Ribonuclease | 13,000 | $10^{-4}$ | .1M phosphate buffer | none | 99 |
| Dextran | 20,000 | .1 | water | none | 55 |
| Dextran | 40,000 | .1 | water | none | 50 |
| Dextran | 200,000 | .1 | water | none | 0 |
| H$^3$-TTP | | $10^{-8}$ | .1M Phosphate | none | 98 |
| Hemoglobin | 68,000 | 2 | Phosphate | none | 0 |
| Bovine serum albumen | 69,000 | 2 | " | none | 0 |
| ss-DNA | 10,000 | " | " | none | 5 |
| ss-DNA | 10,000 | " | " | SDS | 100 |
| ss-DNA | 10,000 | " | " | TCA | 96 |
| ss-DNA | 1,300,000 | " | " | none | 5 |
| ds-DNA | 1,300,000 | " | " | none | 86 |
| ss-DNA | 500,000 | " | " | none | 3 |
| ds-DNA | 500,000 | " | " | none | 94 |
| RNA | 20,000 | " | " | none | 95 |
| RNA | 300,000 | " | " | none | 0 |
| RNA | 300,000 | " | " | SDS | 79 |
| RNA | 1,300,000 | " | " | SDS | 18 |

DNA = Deoxyribonucleic acid, RNA = Ribonucleic acid,
TTP = Thiamine Triphosphate, SDS = Sodium Dodecyl Sulfate,
TCA = Trichloroacetic Acid

EXAMPLE 2

The above formulation may be modified by adding non-solvents to the polymer casting solution, resulting in membranes of increased porosity and pore size.

A solution of 8.5 weight percent of poly-phenyl-as-triazine (Structure I) in 50/50 vol. percent of meta-cresol and toluene was cast into an ultrafiltration membrane as described in Example 1, except that the quench bath contained a mixture of 95 vol. percent ethyl alcohol and 5 vol. percent water.

The membrane thus obtained had a thickness of 0.03 cm, a specific water content of 0.662 g/cm$^3$, a water flux of $1.68 \times 10^{-7}$ cc/dyne-sec, and an average pore size of 40 Å. In contrast to the membrane described in Example 1, the membrane of Example 2 allows the passage of the protein bovine serum albumin (M.W. 69,000) without loss or change in concentration.

EXAMPLE 3

The membrane as described in Example 1 may further be modified by the addition of surfactants to the polymer casting solution.

Sodium dodecyl sulfate, 0.2 weight percent, is added to a solution of 8.5 weight percent of poly-phenyl-as-triazine (Structure I) in meta-cresol as solvent, by slowly adding the surfactant at 45° C. with moderate stirring. This polymer solution is cast into an ultrafiltration membrane as described in Example 1. The ultrafiltration properties of this membrane are similar to the one described in Example 1, except that the membrane of Example 3 is completely stable with respect to water flux after repeated drying for several days followed by rewetting with water.

EXAMPLE 4

The membrane of Example 1 may further be modified by the addition of salts.

Poly-phenyl-as-triazine (Structure I), 11.3 g, is dissolved in a mixture of 45 g of meta-cresol and 60 g of dimethylacetamide to which 4.5 g of lithium chloride has been added. This solution is cast onto a glass plate by means of a casting knife with a knife gap of 0.02 inch. The wet film is immediately placed into a bath containing a mixture of 60/40 vol. percent of methanol and water. After a period of 40 seconds the film becomes opaque and the remaining solvents and salt is leached out of the film by repeated washing with methyl alcohol followed by rinsing with distilled water. The ultrafiltration membrane thus obtained has a water content of 0.598 g/cm$^3$ and a membrane thickness of 0.061 cm. When used as an ultrafilter this membrane exhibits strong anisotropic flow behavior toward serum albumin and dyes. For example, the shiny skinned surface does not absorb phenol red, while the dull surface absorbs the dye very strongly. Ultrafiltration of serum albumin with the skinned surface towards the protein solution results in complete rejection of the solute. On the other hand filtration with the dull surface towards the protein solution results in partial passage of the protein molecules.

EXAMPLE 5

Poly-quinoxaline (Structure II) is dissolved in meta-cresol to obtain an 8 weight percent solution. A small amount of undissolved polymer is removed by filtering the solution through a 10 micron polypropylene filter. The clear filtrate is cast onto a glass plate by means of a casting knife with a knife gap of 0.02 inch. The glass plate is immediately immersed into a bath containing methyl alcohol, forming the opaque ultrafilter. The membrane is stored in a sterile solution containing 0.5 percent formaldehyde in distilled water. The ultrafilter obtained in this way had a thickness of 0.038 and a water flux of $6.51 \times 10^{-8}$ cc/dyne-sec. Ultrafiltration of ribonucleic acid solutions containing low and high molecular weight fractions through this membrane resulted in a near quantitative separation of the low from the higher molecular weight material.

EXAMPLE 6

Polyphenylquinoxaline (Structure III), 14.6 g, was dissolved in 200 cc of chloroform. The resulting solution was cast onto a glass plate by means of a casting knife (0.02 inch knife gap) and the surface of the wet film was exposed to the vapors of methyl alcohol causing slow gelation of the polymer film. The gelled film was then dipped into a solution of 50 vol. percent hexane and 50 vol. percent toluene to remove any residual chloroform and methanol from the interior of the membrane. This procedure was followed by several washes with methyl alcohol to remove the hexane and toluene. Finally, the membrane was stored in a mixture of 10 vol. percent methanol and 90 vol. percent water. The membrane obtained had a thickness of 0.45 cm, a water flux of $0.36 \times 10^{-8}$ cc/dyne-sec., and an average pore diameter of 19 Å.

EXAMPLE 7

Polyquinoline (Structure IV) was dissolved in chloroform to obtain a 10 weight percent solution. A film of this material was prepared as described in Example 1 and quenched into a bath containing methyl alcohol. After a period of 2 hours the opaque film membrane was removed from the quench bath and stored in a solution of 20 vol. percent methyl alcohol and 80 vol. percent water. The membrane thus obtained had a thickness of 0.065 cm and a low pressure membrane constant of $2.7 \times 10^{-8}$ cc/dyne-sec.

A portion of this membrane was modified by treating it with a 0.1% solution of methanesulfonyl chloride in hexane for a period of 2 minutes, followed by exposure to water for a period of 20 minutes. This modification resulted in a membrane with a water flux of $5.83 \times 10^{-8}$ cc/dyne-sec.

EXAMPLE 8

A solution containing 10.0 g of polyphenyl-as-triazine (Structure I) and 10.0 g of polyphenylquinoxaline (Structure III) was dissolved in a mixture of 50 vol. percent sulfuric acid and 50 vol. percent methanesulfonic acid to obtain a 10 weight percent solution. The solution was then spread onto a glass plate by means of a casting knife with a 0.02 inch gap. The glass plate was then immersed into a water bath which solidified the wet film instantly. The ultra-filtration membrane thus obtained exhibited a water flux of 1.90 cc/dyne-sec.

EXAMPLE 9

A copolymer of polyquinoxaline (Structure II) and polyphenylquinoxaline (Structure III) (30-70 random copolymer) was dissolved in meta-cresol to form a 6 weight percent solution. An ultrafiltration membrane was then made from this solution as described in Example 1. The membrane exhibited a water flux of $3.2 \times 10^{-8}$ cc/dyne-sec. and had a pore size of 30 Å.

EXAMPLE 10

A 15% solution of polyphenylquinoxaline (Structure III) in a 50/50 volume ratio of m-cresol and chloroform was cast onto a Dacron cloth using a 15 mil knife gap between the cloth and the knife. Then the wet impregnated fabric was quenched into isopropyl alcohol and the solvent allowed to leach out, leaving a reinforced ultrafilter which gave a water flux of 4 cc/min/cm$^2$ of filter area at an an applied pressure of 2 psig.

EXAMPLE 11

Preparation of a Polyquinoxaline

A 250 ml three neck round bottom flask was charged with 179.8 ml of meta-cresol, 13.2232 g of 3,3',4,4',-tetraaminobenzophenone and 23.7098 g. of 4,4'-oxy(bisbenzil). The mixture was stirred under ambient conditions for 5 hours, resulting in a clear dark-reddish, viscous solution (viscosity 20,000 cps) with a 15 wt.% of polyquinoxaline in the solvent. This solution was transferred into a one liter container and sufficient chloroform was added to obtain a 4.0 wt.% solution. This solution was used in the preparation of ultrafilters.

EXAMPLE 12

Preparation of a Poly (phenyl-as-triazine)

To a stirred solution of 9.66 g. of 2,6-pyridinediyldiimidrazone in 200 ml of a 1:1 mixture of m-cresol and xylene, 21.72 g of 4,4'-oxy(bisbenzil) was added over a period of 10 minutes. After the initial surge in temperature, the reaction mixture was stirred at ambient temperature for 12 hours. This solution provides a 10% solution by weight which has a viscosity of 3000 to 15,000 cps, depending on the purity of monomers. The inherent viscosity of a 0.5% solution in meta-cresol at 25 degrees C. is 0.5-2.2 dl/g. The 10% solution is diluted with chloroform to provide a 6% solution, which is suitable for casting into ultrafilters.

EXAMPLE 13

Preparation of a Polyquinoline

A mixture of 135 g of polyphosphoric acid and 25 ml of m-cresol was stirred under a blanket of nitrogen for 10 minutes at 65 degrees C. and for 30 minutes at 110 degrees C. This solvent mixture was then allowed to cool to room temperature and 34.3 g of 4,4'-Bis(2-aminobenzoyl) diphenyl ether and 21.4 g of 4,4'-diacetyldiphenyl ether were added. The resulting 7 wt.% solution was then heated to 130 degrees C. for 48 hours and cooled to room temperature. The reaction mixture was poured into 6 l of ethanol containing 300 ml of triethylamine to give a white fibrous polymer. This material was then dissolved in a 1:1 mixture of meta-cresol-chloroform to give a 4% polymer solution which was suitable for the preparation of ultrafilters.

We claim:

1. A membrane consisting of a microporous structure having semipermeable properties, said membrane being formed by contacting a film made from a solution containing at least one heteroaromatic polymer with a nonsolvent in which said polymer is essentially insoluble, said polymer having a recurring structure selected from the group consisting of one or more of the following formulas:

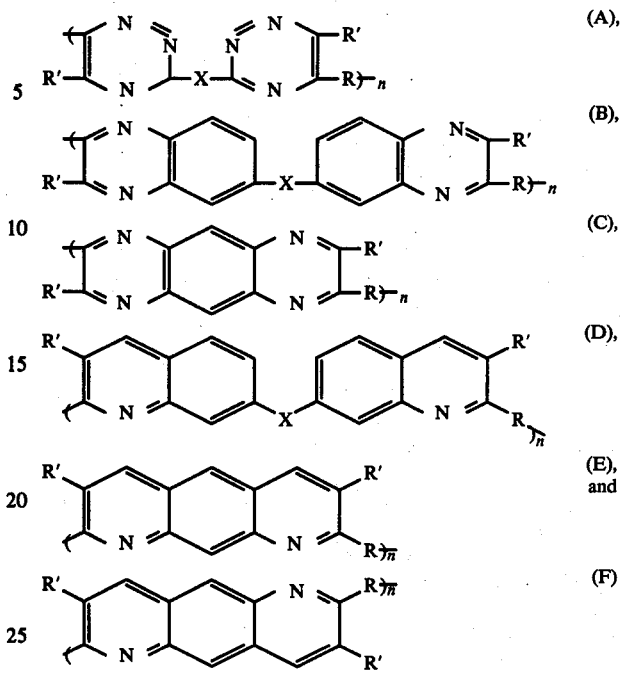

wherein R is phenylene, diphenylene, diphenyl ether, diphenylsulfide, diphenyl sulfone, diphenylmethane, naphthyl, pyridylidene or alkylene of 1 to 6 carbon atoms, R' is hydrogen, an aromatic radical or an aliphatic radical, X is a carbon-to-carbon bond, oxygen, sulfur, sulfone, methylene, isopropylene, carbonyl or pyridylidene and n is 10 to 10,000.

2. The membrane of claim 1 in which R' is hydrogen, phenyl, toluyl or alkyl of 1 to 12 carbon atoms.

3. The membrane of claim 1 in which said polymer comprises a poly-as-triazine having the recurring structure of formula (A) in claim 1.

4. The membrane of claim 1 in which said polymer comprises a polyquinoxaline having the recurring structure of formula (B) in claim 1.

5. The membrane of claim 1 in which said polymer comprises a poly (pyrazinoquinoxaline) having the recurring structure of formula (C) in claim 1.

6. The membrane of claim 1 in which said polymer comprises a polyquinoline having the recurring structure of formula (D) in claim 1.

7. The membrane of claim 1 in which said polymer comprises a poly (anthrazoline) having the recurring structure of formula (E) or (F) in claim 1.

8. The membrane of claim 1 in which said polymer has a molecular weight greater than 20,000.

9. The membrane of claim 1 in which said polymer consists of a chain having two or more different recurring structures.

10. The membrane of claim 1 in which said polymer solution comprises of a mixture of two or more of said heteroaromatic polymers.

11. The membrane of claim 1 in which said polymer includes covalently bonded groups incorporated into said polymer, said groups being sulfonic acids, hydroxyl groups, carboxylic acids, mercaptans or amines, said polymer having at least one of said covalently bonded groups for every chain length interval of six heteroaromatic radicals.

12. In an intravenous fluid filtration or concentration apparatus for filtering or concentrating intravenous fluid, the improvement comprising a filter for removing inanimate particulate contamination and concentrating said fluid comprising a membrane as defined in claim 1.

13. The intravenous fluid filtration or concentration apparatus of claim 12 in which said membrane has a pore size which will remove bacteria and viruses.

14. The intravenous fluid filtration or concentration apparatus of claim 12 in which said apparatus is an intravenous set for supplying intravenous fluid to a patient.

15. In an apparatus for concentrating and filtering protein solutions, the improvement comprising an in-line filter for filtering out undesirable impurities and concentrating said solutions comprising a membrane as defined in claim 1.

16. The apparatus of claim 14 in which said apparatus comprises a syringe having said membrane associated therewith.

17. In an apparatus for filtering and clarifying beverages and the like, the improvement comprising an in-line filter for filtering out undesirable impurities and clarifying said beverages comprising an in-line filter comprising a membrane as defined in claim 1.

18. The apparatus of claim 17 in which said beverages are wine, beer or syrups.

19. In an apparatus for filtering drug solutions prior to packaging, the improvement comprising an in-line filter comprising a membrane as defined in claim 1.

20. In an apparatus for preparing sterile, particle free water and aqueous chemical solutions, the improvement comprising an in-line filter comprising the membrane of claim 1.

21. A method of making an ultrafiltration membrane comprising dissolving at least one heteroaromatic polymer in a solvent, casting a liquid film of said dissolved polymer and contacting said film with a nonsolvent to cause said film to solidify, said polymer having a recurring structure selected from the group consisting of one or more of the following formulas:

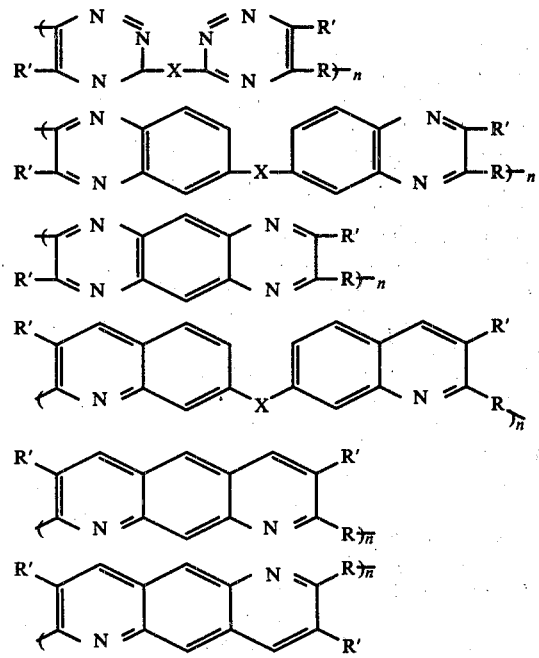

wherein R is phenylene, diphenylene, diphenyl ether, diphenylsulfide, diphenyl sulfone, diphenylmethane, naphthyl, pyridylidene or alkylene of 1 to 6 carbon atoms, R' is hydrogen, an aromatic radical or an aliphatic radical, X is a carbon-to-carbon bond, oxygen, sulfur, sulfone, methylene, isopropylene, carbonyl or pyridylidene and n is 10 to 10,000.

22. The method of claim 21 in which the concentration of polymer in said solvent is at least 2 weight percent and not in excess of 30 weight percent.

23. The method of claim 21 in which said solvent is sulfuric acid or methanesulfonic acid and said nonsolvent is water.

24. The method of claim 21 in which said solvent is a cresol and said nonsolvent is an aliphatic or aromatic hydrocarbon.

25. The method of claim 21 in which said solvent is a chlorinated hydrocarbon selected from the group consisting of chloroform and tetrachloroethane and said nonsolvent is an aliphatic alcohol, ketone or aldehyde.

26. The method of claim 21 in which said liquid film is allowed to develop a porous skinned surface by partially evaporating said solvent, said porous skinned film being subsequently contacted with said nonsolvent.

27. The method of claim 21 in which said liquid film is exposed to the vapors of said nonsolvent, thereby causing said liquid film to solidify.

28. The method of claim 21 in which said nonsolvent is added to said polymer solution prior to membrane formation in such a quantity as to prevent said polymer from precipitating from said solution and in an amount not exceeding 70 volume percent of said solvent.

29. The method of claim 21 in which a surfactant is added to said polymer solution.

30. The method of claim 29 in which said surfactant is sodium dodecyl sulfate.

31. The method of claim 21 in which a salt selected from the group consisting of mono-, di-, and trivalent cations is added to said polymer solution prior to contacting said solution with said nonsolvent.

32. A reinforced ultrafilter comprising a membrane as defined in claim 1 formed on the surface of a reinforcement, said reinforcement being a woven or non-woven fabric or paper.

33. The membrane of claim 1 in which said polymer solution comprises two or more solvents.

34. The membrane of claim 33 in which said two or more solvents are selected from the group of solvent pairs consisting of chloroform and meta-cresol, tetrachloroethane and meta-cresol, methyl chloroform and meta-cresol, methylene chloride and meta-cresol, tetrachloroethane and phenol, methyl chloroform and phenol, and methylene chloride and phenol.

35. The membrane of claim 1 in which said nonsolvent is selected from the group consisting of an aliphatic alcohol, an aliphatic hydrocarbon, an aromatic hydrocarbon, an aliphatic ketone, an aliphatic aldehyde, and an aliphatic nitrile.

36. The method of claim 21 in which said polymer is dissolved in two or more solvents.

37. The method of claim 36 in which said two or more solvents are selected from the group of solvent pairs consisting of chloroform and meta-cresol, tetrachloroethane and meta-cresol, methyl chloroform and meta-cresol, methylene chloride and meta-cresol, tetrachloroethane and phenol, methyl chloroform and phenol, and methylene chloride and phenol.

38. The method of claim 21 in which said nonsolvent is selected from the group consisting of an aliphatic alcohol, an aliphatic hydrocarbon, an aromatic hydrocarbon, an aliphatic ketone, an aliphatic aldehyde, and an aliphatic nitrile.

* * * * *